J. E. EDMUNDSON.
Coffee Roaster.
No. 82,393.
Patented Sept. 22, 1868.
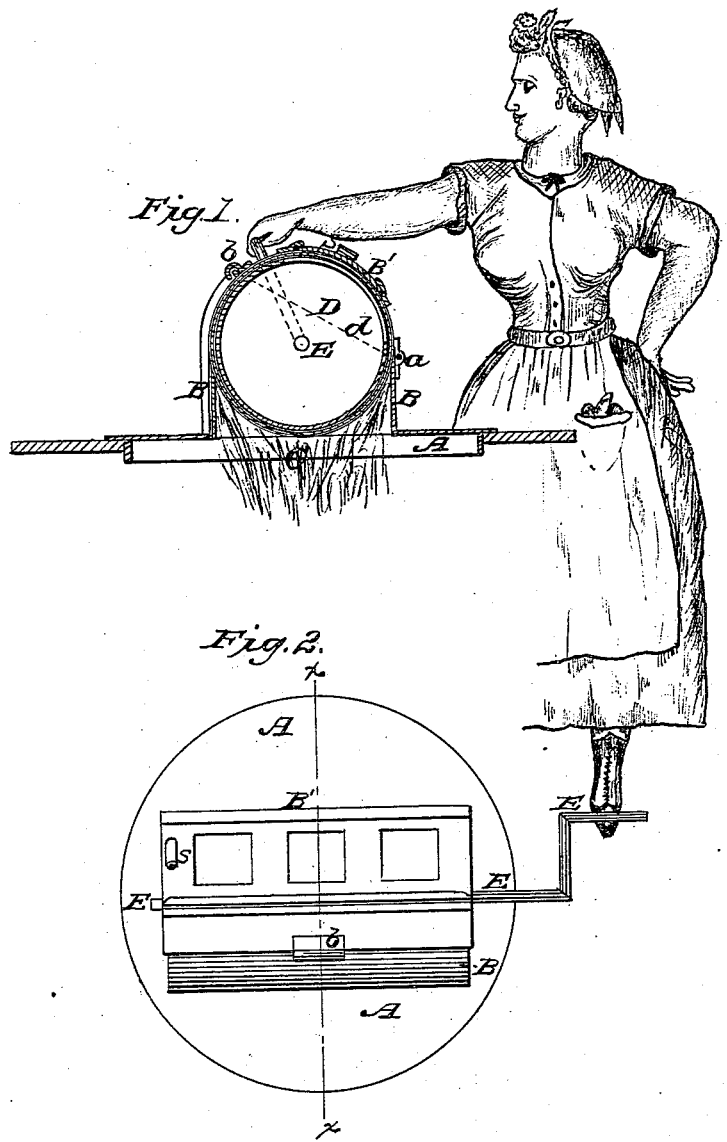
Witnesses:
Inventor:

United States Patent Office

J. E. EDMUNDSON, OF BARTLETT, OHIO.

Letters Patent No. 82,393, dated September 22, 1868.

COFFEE-ROASTER.

*The Schedule referred to in these Letters Patent and making part of the same.*

TO ALL WHOM IT MAY CONCERN:

Be it known that I, J. E. EDMUNDSON, of Bartlett, in the county of Washington, and State of Ohio, have invented a new and improved Coffee-Roaster; and I do hereby declare that the following is a full, clear, and exact description of the construction and operation of the same, reference being had to the accompanying drawings, making a part of this specification, in which—

Figure 1 is a vertical cross-section.

Figure 2 is a top view.

The object of this invention is to produce a neat and convenient instrument for household-use, for the purpose of roasting coffee expeditiously and uniformly, and without diffusing its aroma, and thereby impairing its strength.

In the drawings, A represents a cast-iron plate, made in the form of a stove-cover or "griddle," with a rectangular opening through its centre, and vertical walls, B B, extending up from the edges of the opening, and supporting a cylindrical case, C, to the sides of which the upper edges of the walls B B are closely fitted. The case C is provided with a hinged section, B', having an air-register, s, and a latch, b, constructed and arranged as shown in the drawings.

Within this fixed case or cylinder, and closely fitting to it, a cylinder, D, having the greater portion of one side removed, as shown at d, revolves upon a crank-shaft, E.

The apparatus being thus constructed, its operation is as follows: The door B' is opened, and the cylinder D is partially filled with coffee, through the opening d. The door is then closed and fastened, and the instrument set on a stove. The crank e is then turned, and, by the rotation of the vessel D, having the large opening d, within the fixed case C, the coffee is alternately brought into contact with the heated wall C, and removed therefrom. At the same time, the coffee is thoroughly agitated and intermingled, so that every part of it is brought to the walls of the vessel, and it is heated and roasted with the most perfect uniformity. The register can be closed, so as to save all the aroma and strength of the coffee, or it can be kept partially or wholly open, as may be desired.

The whole apparatus is not only exceedingly effective, roasting the coffee more quickly and more perfectly than can be done by any other device in common use, but its simplicity and cheapness place it within the reach of everybody, while, by merely economizing the strength and fragrance of the berry, it makes such a saving as to pay for itself in a short time.

I am aware that coffee-roasters have been heretofore constructed and used, consisting of a single rotating cylinder, in an arch, or between walls, which rest upon the stove, and concentrate the heat upon the bottom of the cylinder. I do not claim such devices to be my invention. None of them have the rotating cylinder operating within a fixed cylinder, which constitutes the main feature of my improved device, and by which important results are attained, to wit:

First, the fire not being directly in contact with the iron bottom, on which the coffee rests, there is less danger of burning, and the machine requires to be turned less than half the time.

Secondly, it may be used open or shut, a thing impossible with those heretofore in use.

Thirdly, there is no danger of the coffee being burned while the operator is inspecting it.

I claim the arrangement of the plate A, walls B B, fixed cylindrical case C, having the door B', rotating interior cylinder D, having the opening d in its side, and crank-shaft E, substantially as described and shown, and for the purpose specified.

J. E. EDMUNDSON.

Witnesses:
A. C. MORROW,
JAMES GUMMER.